Dec. 22, 1959 M. K. KAUSCHE 2,917,893
SPROCKET CHAIN LINK CONNECTOR AND DISCONNECTOR
WITH MEANS TO SLACKEN CHAIN TENSION
Filed Jan. 17, 1958 3 Sheets-Sheet 1

INVENTOR.
Merle K. Kausche
BY
Atty.

Dec. 22, 1959  M. K. KAUSCHE  2,917,893
SPROCKET CHAIN LINK CONNECTOR AND DISCONNECTOR
WITH MEANS TO SLACKEN CHAIN TENSION
Filed Jan. 17, 1958  3 Sheets-Sheet 2

INVENTOR.
Merle K. Kausche
BY
*Fred Wells*
Atty.

Dec. 22, 1959 M. K. KAUSCHE 2,917,893
SPROCKET CHAIN LINK CONNECTOR AND DISCONNECTOR
WITH MEANS TO SLACKEN CHAIN TENSION
Filed Jan. 17, 1958 3 Sheets-Sheet 3

INVENTOR.
Merle K. Kausche
BY
Atty

United States Patent Office 2,917,893
Patented Dec. 22, 1959

2,917,893

SPROCKET CHAIN LINK CONNECTOR AND DISCONNECTOR WITH MEANS TO SLACKEN CHAIN TENSION

Merle K. Kausche, Walla Walla, Wash.

Application January 17, 1958, Serial No. 709,621

4 Claims. (Cl. 59—7)

The present invention relates to improvements in sprocket chain connecting and disconnecting means.

My invention is intended for use in connecting sprocket chains of the type which consist of a plurality of identical links, each link comprising two spaced apart longitudinally extending side rails connected together at one end by a transverse bar and connected together at the opposite end by a transverse cylindrical tubular portion. These links are joined to form an endless flexible chain by insertion of the transverse bar of each link into the tubular portion of the next adjacent link. To permit such insertion, the tubular portion of each link is provided with a slot which extends transversely from one end to the other, through which the side rails of a link may pass as the transverse bar of that link is inserted through the tubular portion. To prevent accidental disengagement of links during use of the chain, the slot in each link is so positioned in the tubular portion that links can only be connected or separated when they are angularly disposed with respect to each other.

In connecting and disconnecting links in chains of this type, considerable difficulty is often experienced in holding the two links to be joined or separated in the proper angular relation while one is moved transversely with respect to the other. This is particularly true where the links must be connected or disconnected while the chain is trained around the sprockets between which it transmits power. In order for the chain to properly perform its function, it must be fairly tight. Usually there is just enough slack to permit two adjacent links to be brought into correct position for connection or disconnection, and some force is necessary to maintain them in proper position. Often the links are constructed so that some force is necessary to push the side rails of one link through the slot in the adjacent link. The person attempting to connect or disconnect links under such circumstances is thus faced with the problem of holding the links in proper relation by force and at the same time, forcing one transversely of the other. Considerable time and effort is frequently spent in performing what should be a simple operation.

It is the principal purpose of this invention to provide a simple tool capable of holding two adjacent links in proper angular relation and forcing one transversely with respect to the other to either connect or disconnect the links while the chain is in operative position.

A further purpose of the invention is to provide a tool of this character which is economical to manufacture, and which is easily handled and simple to use.

Still another purpose of the invention is to provide such a tool which is adapted for use with sprocket chains of varying dimensions.

Basically, my invention comprises a base or body member having clamping means thereon for clamping one link of the chain in fixed relation to the body unit, arm and hook means on the base operable to engage the next adjacent link and force it toward the clamped link until the proper angular relation for connecting or disconnecting may be obtained, and second clamp means on the body movable transversely with respect to the first clamping means operable to be clamped to the link engaged by the arm and hook means to force it into or out of engagement with the first named link.

The nature and advantages of my invention will appear more clearly from the following description and the accompanying drawings wherein a preferred form of the invention is shown. It should be understood, however, that the drawings and description are illustrative only and are not intended to limit the invention, except insofar as it is limited by the appended claims.

Figure 2:
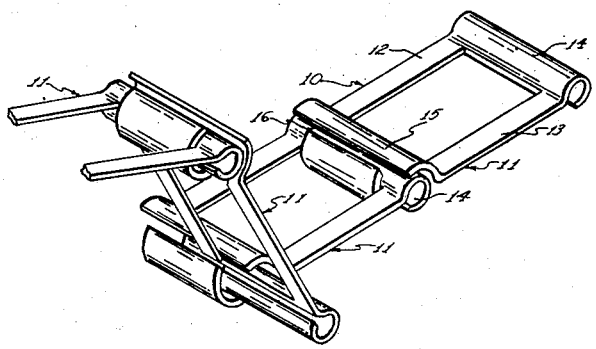
Figure 2 is a perspective view of a section of sprocket chain of the type that my invention is designed to manipulate.

Referring now to the drawings, I have shown in Figure 2, a section of sprocket chain 10 of the type that my invention is adapted to manipulate. As illustrated, this well known chain 10 comprises several links 11 which are identical in form. Each link 11 has two longitudinally extending side rails 12 and 13 which are spaced apart to receive sprocket teeth therebetween. At one end, the rails 12 and 13 are connected together by a transverse bar 14. The bar 14, illustrated in the drawings is rolled to form a generally cylindrical shape; however, it may take the form of a flat bar in some chains. At the opposite ends of the rails 12 and 13, a transverse cylindrical tubular portion 15 is provided. The axis of the portion 15 extends transversely of the rails 12 and 13.

The links 11 are joined by interconnecting the transverse bar 14 of each with the tubular portion 15 of the next adjacent link 11. The interconnected tubular portions 15 and bars 14 form cross rails at spaced intervals along the chain 10 to provide driving engagement with the sprocket teeth. To permit the interconnection of the portions 15 and bars 14, each link 11 has a slot 16 extending from one end of its tubular portion 15 to the other. When links are to be interconnected, the bar 14 of one is slid endwise into the tubular portion 15 of the other, the slot 16 permitting the rail 12 or 13 at the side of the bar 14 being advanced, to pass therethrough. It will be noted that the slot 16 in each link 11 is so positioned that interconnection or disconnection of links 11 can only occur when they are disposed with respect to each other at a fairly sharp angle. This prevents accidental disconnection during use of the chain.

To connect or disconnect links 11 of the chain 10, it is necessary to firmly grasp the two links to be manipulated, bring them to the proper relative angular position, and then move one transversely of the other a distance at least equal to the width of a link. My improved connecting and disconnecting device is designed to perform these functions. The device, generally designated by the numeral 17, comprises a body or base member 18 which serves as a common support for the several elements of the device. The base member 18 has upstanding flanges 19 and 20 at its opposite ends as shown in the drawings.

Figure 5:
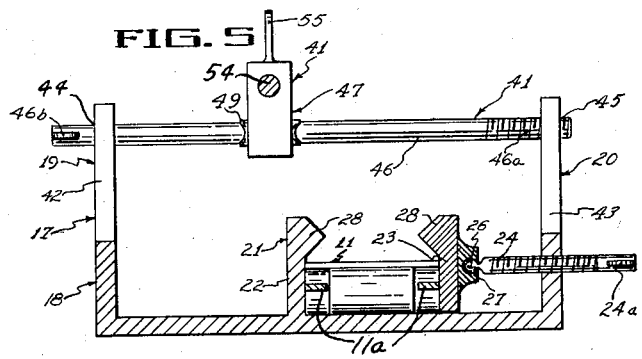
Figure 5 is a fragmentary sectional view taken on the line 5—5 of Figure 3.

Intermediate the upstanding flanges 19 and 20, vise or clamp means 21 are provided. The vise means 21 comprises a fixed vise jaw 22 formed on the base 18 intermediate its ends, and a movable vise jaw 23 positioned between the jaw 22 and the end flange 20. The movable jaw 23 has two threaded bolts 24 and 25 mounted thereto. As shown best in Figure 5, each of the bolts 24 and 25 has a ball 26 formed on the end thereof adjacent the movable jaw 23. The balls 26 are received in sockets 27 formed on the movable jaw 23 and are thus connected to the jaw 23 for free axial rotation. The bolts 24 and 25 are threaded through the upstanding flange 20 of the base 18 and have turning handles 24a and 25a thereon. By rotating the bolts 24 and 25 in the proper direction, the movable jaw 23 may be moved toward or away from the fixed jaw 22.

Figure 4:
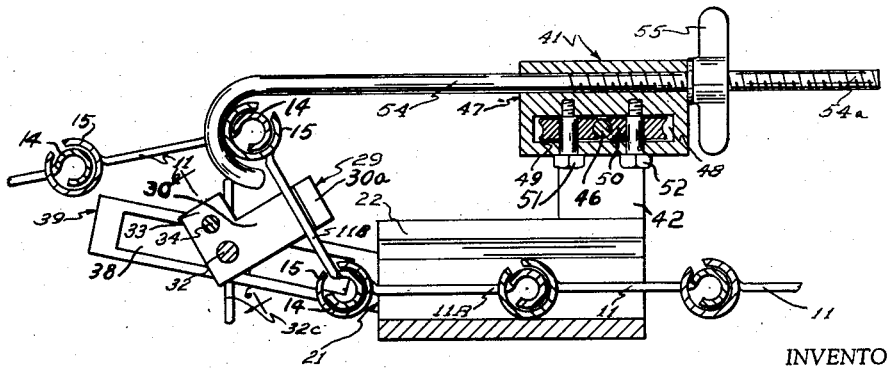
Figure 4 is a vertical sectional view taken substantially on the line 4—4 of Figure 3, but showing a sprocket chain engaged with the device.

The vise means 21 just described is adapted to receive and firmly grip one of the two links 11 to be connected or disconnected. The two links 11 being manipulated will hereinafter be referred to as links 11A and 11B, link 11A being the one clamped in the vise means 21. As shown in Figure 4, link 11A is clamped in the vise means 21 so that the cross rail formed by the interconnection of the tubular portion 15 of link 11A and the transverse bar 14 of link 11B, is positioned immediately in front of the leading edge of the base member 18, with the slot 16 in the tubular member 15 facing upwardly. It will be noted that each of the jaws 22 and 23 is provided with a V-shaped projection 28 adjacent its upper edge. These projections 28 serve to hold the link 11A against upward movement.

Figure 1:
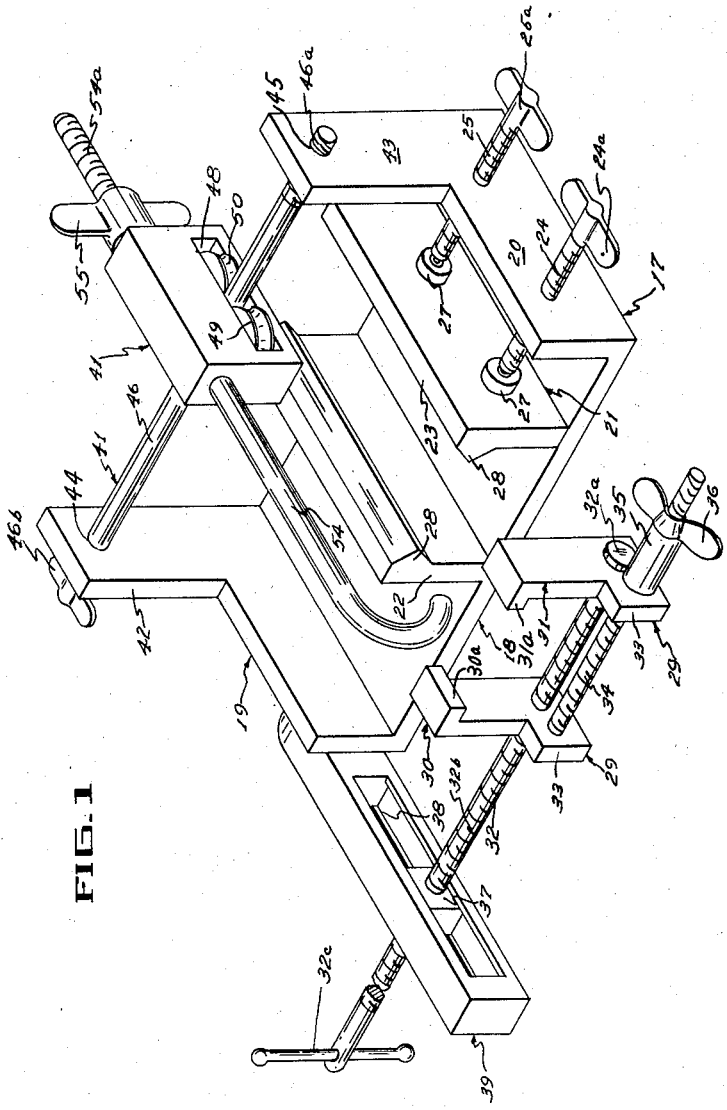
Figure 1 is a perspective view of my invention.
Figure 6:
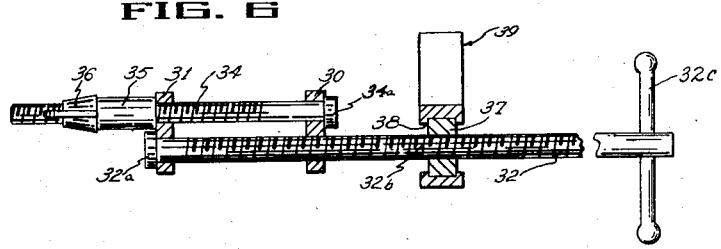
Figure 6 is a fragmentary sectional view taken on the line 6—6 of Figure 4.
Figure 3:
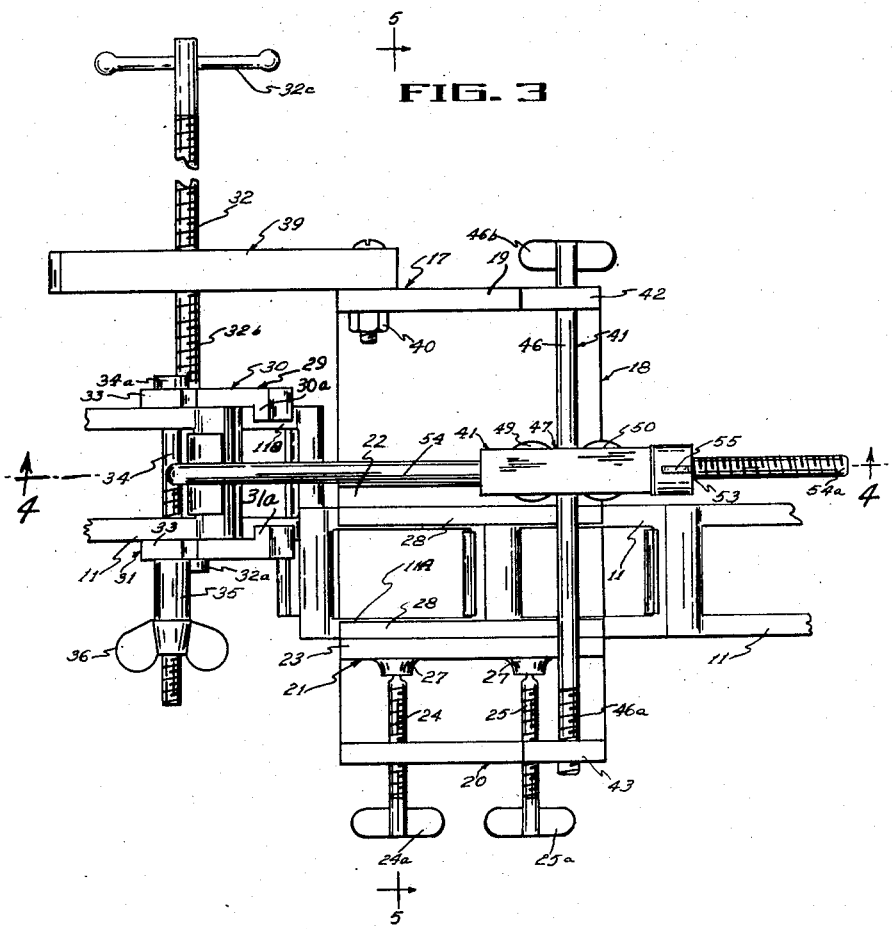
Figure 3 is a plan view of the invention illustrating it in position to disconnect two links of a sprocket chain.

To grip the link 11B, second clamp means 29 are provided. As shown in the drawings, the clamp means 29 comprise opposed clamping jaws 30 and 31 which are loosely mounted upon a transverse shaft 32. The jaws 30 and 31 have ears 33 formed thereon between which a clamping bolt 34 extends. As shown in Figures 3 and 6 the bolt 34 has a head 34a fixed thereon outside the jaw 30 and has a spacer 35 and wing nut 36 threaded thereon outside the jaw 31. By threading the wing nut 36 toward the head 34a, the jaws 30 and 31 may be forced together to grip the side rails 12 and 13 of the link 11B. As shown in Figures 1, 3 and 4, the jaws 30 and 31 have inwardly extending lips 30a and 31a which secure the link 11B against slipping from between them.

The clamp means 29 just described is adapted to move the link 11B transversely of the link 11A held in the vise means 21. As earlier herein described, the jaws 30 and 31 are mounted upon a shaft 32. The jaws 30 and 31 are loosely mounted for free movement toward and away from each other under influence of the bolt 34 and nut 36, but the shaft 32 has a head 32a thereon outside of the jaw 31 which will engage and move the jaws 30 and 31 transversely when the shaft 32 is so moved. The shaft 34 extends transversely from the jaws 30 and 31 toward the end of the base member 18 whereon the flange 19 is positioned, and has a threaded portion 32b thereon, terminating in a turning handle 32c. A nut 37 is threaded on the portion 32b. The nut 37 is slidably but non-rotatably mounted in a guide slot 38 formed in a fore and aft extending arm 39. The arm 39 is pivoted by a pivot bolt 40 to the upstanding end flange 19 on the base member 18. With the construction just described, rotation of the handle 32c will cause the threaded shaft 32 to be moved transversely with respect to the arm 39 and the base 18, and consequently will cause the clamp means 29 to be moved transversely of the base 18, to connect or disconnect the links 11A and 11B.

The pivotal connection of the arm 39 to the base 18, and the sliding connection of the nut 37 on the arm 39 permits a wide range of relative movement between the clamp means 29 and the base 18 to permit use of the device upon chains of various dimensions and various "unlocking angles" or angles at which connection and disconnection is possible.

The links 11A and 11B cannot, under any circumstances, be connected or disconnected unless and until they are brought to the proper relative angular position. To bring the links 11A and 11B to proper position, the slack in the chain 10 must be taken up. To accomplish this, I provide a unique slack pulling means, generally designated by the numeral 41. As illustrated in the drawings, the end flanges 19 and 20 have upwardly projecting ears 42 and 43. The ear 42 has a smooth aperture 44 therein and the ear 43 has a threaded aperture 45 therein. A cross rod 46 extends between the ears 42 and 43, being received in the apertures 44 and 45. The cross rod 46 has a threaded end portion 46a at one end which threads into the aperture 45 to secure the cross rod 46 in place, and is provided with a turning handle 46b at the other end.

The cross rod 46 supports a block 47 thereon intermediate the ears 42 and 43. As best illustrated in Figure 4, the block has a transverse rectangular aperture 48 extending therethrough near its lower edge. Within the aperture 48, two spaced apart horizontal rollers 49 and 50 are provided. The rollers 49 and 50 are journalled on axle bolts 51 and 52 which extend upwardly into the block 47 from the bottom. The rollers 49 and 50 are formed with grooved circumferential surfaces and are spaced apart to receive the cross rod 46 therebetween. The rollers 49 and 50 mount the block 47 upon the cross rod 46 for free endwise movement, and for free pivotal movement in a vertical direction.

The block 47 has a fore and aft extending aperture 53 therein above the rollers 49 and 50. The aperture 53 receives the threaded shank portion 54a of a hook 54. A thumb nut 55 is threaded on the shank 54a of the hook 54 behind the block 47. By rotation of the thumb nut 55, the hook 54 can be moved toward or away from the block 47.

The purpose of the slack pulling means 41 just described, is to engage the chain 10 at a point ahead of the links 11A and 11B and pull it toward the base member 18 to gather the slack required to interengage or disengage the links 11A and 11B. To accomplish this the hook 54 is extended out and hooked over the cross rail formed by the interengaged tubular portion 15 of the link 11B and the transverse bar 14 of the next adjacent link. The thumb nut 55 is then rotated to pull the hook 54 toward the block 47 until the links 11A and 11B may be brought to the correct relative angular position. Figure 4 illustrates the hook 54 in position to bring the links 11A and 11B to the unlocking position.

Once the links 11A and 11B are properly positioned, all that remains to be done is to move the link 11B transversely with respect to the link 11A to effect the interengagement or disengagement of the transverse bar 14 of the link 11B with the tubular portion 15 of the link 11A. This is accomplished by rotation of the turning handle 32a on the shaft 32 to move the clamp means 29 toward the arm 39.

As hereinbefore stated, my improved connecting and disconnecting device 17 is adapted to either connect or disconnect links such as those shown at 11A and 11B. When the device is used to disconnect links 11A and 11B of an endless sprocket chain 10, it is first secured on the chain by clamping the link 11A between the jaws 22 and 23 of the vise means 21. In order to get the link 11A into the grip of the jaws 22 and 23, it is necessary to remove the cross rod 46 to permit the chain to be dropped into the vise means 21. This is accomplished by rotating the handle 46b of the cross rod 46 to disengage the threaded portion 46a from the aperture 45, so that the cross rod 46 may be pulled back through the aperture 44 in the upstanding ear 42. When the link 11A has been securely clamped in the vise means 21, the cross rod 46 may be again threaded into the threaded aperture 45 in the ear 43 to provide proper support for the slack pulling means 41. The link 11B is clamped between the jaws 30 and 31 of the clamping means 29 and the hook 54 is extended out and hooked over the cross rail which joins the link 11B to the next adjacent link. When the hook 54 has been engaged, the thumb nut 55 is rotated to pull the hook toward the base 18. This movement causes the link 11B to be pivoted upwardly about the tubular portion 15 on the link 11A. When the proper angular relation is obtained, the shaft 32 is rotated by the handle 32c thereon to force the link 11B transversely of the link 11A to disengage the transverse bar 14 of the link 11B from the tubular portion 15 of the link 11A, thereby disconnecting these two links. It will be noted that in moving the link 11B transversely, the hook 54 is also moved. Rollers 49 and 50 which mount the block 47 to the cross rod 46 permit the block 47 and hook 54 to move freely with the link 11B.

When it is desired to connect the links 11A and 11B, they are clamped in the vise means 21 and clamping means 29 in the manner described, and the hook 54 is manipulated to pull the link 11B toward the link 11A until the proper relative angular position can be obtained. The shaft 32 is then threaded in the nut 37 to move the clamp means 29 and link 11B to the side of the link 11A adjacent the movable jaw 23 of the vise means 21. The transverse bar 14 of the link 11B is then inserted into the open end of the tubular portion 15 of the link 11A and the shaft 32 is rotated in a reverse direction to pull the link 11B into alignment with the link 11A and thus engage the transverse bar 14 with the tubular portion 15.

Figure 7:
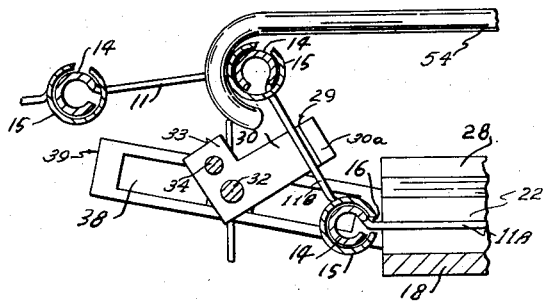
Figure 7 is a fragmentary sectional view similar to Figure 4, but showing the chain links reversed.

In Figures 3 and 4, I have shown the link 11A, which is clamped in the vise means 21, as having the tubular portion 15 to be interengaged or disengaged, and the link 11B, which is clamped in the clamping means 29, as having the transverse bar 14 to be interengaged or disengaged. It should be clearly understood that it is not essential to operation of my device that this particular relationship obtain. As illustrated in Figure 7, the device is operable in the same manner when the tubular portion 15 to be interengaged or disengaged is carried by the link mounted in the clamp means 29 and the link carrying the transverse bar 14 is secured in the vise means 21.

It is believed that the nature and advantages of my invention appear clearly from the foregoing.

Having thus described my invention, I claim:

1. A device for connecting and disconnecting sprocket chain links of the type comprising transversely spaced side rails connected together at one end by a transverse bar and connected together at the other end by a slotted transverse tubular portion, said links being connected by means of mounting said transverse bar of one link within said tubular portion of the adjacent link said device comprising a base member, vise means on the base member operable to clamp a chain link in fixed relation to the base member, hook means pivotally and slidably connected to the base member for movement transversely of the vise means and operable to engage a second link, means to move the hook means endwise toward the vise means and thereby move the second link toward the link secured on the base member, clamp means operable to clamp the second link therein, and means connecting the clamp means to the base member operable to move the clamp means transversely of the base member whereby to move the second link transversely of the link secured to the base member to connect and disconnect the first and second links.

2. A device for connecting and disconnecting sprocket chain links of the type comprising transversely spaced side rails connected together at one end by a transverse bar and connected together at the other end by a slotted transverse tubular portion, said links being connected by means of mounting said transverse bar of one link within said tubular portion of the adjacent link said device comprising a base member, vise means on the base member operable to clamp a chain link in fixed relation to the base member, a block supported on the base member for free movement transversely of the vise means, a hook member supported by said block and extending forwardly therefrom beyond said vise means endwise of the clamped chain link, said hook member being operable to engage with a second chain link, means connecting said hook member and said block operable to draw the hook member toward the block to draw the second link toward the link secured on the base member, clamp means operable to clamp said second link therein, a transverse shaft supporting said clamp means, arm means pivoted to the base member and extending forwardly therefrom, said shaft being supported in the arm means, and means connecting said transverse shaft to the arm means to move the shaft and the clamp means transversely of the base member whereby to move the second link transversely of the link secured to the base member to connect and disconnect the first and second named links.

3. A device for connecting and disconnecting sprocket chain links of the type comprising transversely spaced side rails connected together at one end by a transverse bar and connected together at the other end by a slotted transverse tubular portion, said links being connected by means of mounting said transverse bar of one link within said tubular portion of the adjacent link said device comprising a base member, vise means on the base member operable to clamp a chain link in fixed relation to the base member, a transverse rod supported on the base member above the vise means, a block mounted on said rod for free movement thereon axially of the rod, a hook member supported by said block and extending forwardly therefrom beyond said vise means endwise of the clamped chain link, said hook member being operable to engage with a second chain link, means connecting said hook member and said block operable to draw the hook member toward the block and thereby move the second link toward the link secured on the base member, clamp means operable to clamp said second link therein, a transverse shaft supporting said clamp means, arm means pivoted to the base member and extending forwardly therefrom, said shaft being supported in the arm means, and means connecting said transverse shaft to the arm means to move the shaft and the clamp means transversely of the base member whereby to move the second link transversely of the link secured to the base member to connect and disconnect the first and second named links.

4. A device for connecting and disconnecting sprocket chain links of the type comprising transversely spaced side rails connected together at one end by a transverse bar and connected together at the other end by a slotted transverse tubular portion, said links being connected by means of mounting said transverse bar of one link within said tubular portion of the adjacent link said device comprising a base member, a first vise jaw fixed on said base member, a second vise jaw movably supported on said base member for movement toward and away from the first jaw, means to move said second jaw to clamp a link between the jaws in fixed relation to the base member, a transverse rod supported on the base member above the jaws, a block pivoted on said rod for free pivotal movement thereon and slidable longitudinally of said rod for free movement therealong transversely of the vise jaws, a hook member mounted in the block and extending forwardly therefrom, said hook member being operable to engage a second link, means connecting the hook member to the block operable to draw the hook member toward the block and thereby move said second link toward the link secured on the base member, clamp means operable to clamp said second link therein, a transverse shaft supporting said clamp means, arm means pivoted to the base member and extending forwardly therefrom, said shaft being supported in the arm means, and means connecting said transverse shaft to the arm means to move the shaft and the clamp means transversely of the base member whereby to move the second link transversely of the link secured to the base member to connect and disconnect the first and second named links.

References Cited in the file of this patent

UNITED STATES PATENTS

| | | |
|---|---|---|
| 2,377,270 | Schneider | May 29, 1945 |
| 2,379,001 | Hage | June 26, 1945 |
| 2,616,241 | Palsgrove | Nov. 4, 1952 |

FOREIGN PATENTS

| | | |
|---|---|---|
| 471,597 | Canada | Feb. 20, 1951 |